(12) United States Patent
Yamamoto et al.

(10) Patent No.: US 12,271,203 B2
(45) Date of Patent: Apr. 8, 2025

(54) SEARCH SYSTEM, SEARCH METHOD, AND STORAGE MEDIUM

(71) Applicant: HONDA MOTOR CO., LTD., Tokyo (JP)

(72) Inventors: Sachiko Yamamoto, Wako (JP); Shinichiro Kobashi, Wako (JP); Makoto Hasegawa, Wako (JP); Marika Mochizuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 293 days.

(21) Appl. No.: 17/951,141

(22) Filed: Sep. 23, 2022

(65) Prior Publication Data

US 2023/0102926 A1 Mar. 30, 2023

(30) Foreign Application Priority Data

Sep. 30, 2021 (JP) .................. 2021-161620

(51) Int. Cl.
*G06V 20/58* (2022.01)
*G05D 1/00* (2006.01)
(Continued)

(52) U.S. Cl.
CPC ......... *G05D 1/0231* (2013.01); *G05D 1/0212* (2013.01); *G05D 1/0287* (2013.01);
(Continued)

(58) Field of Classification Search
CPC .. G05D 1/0231; G05D 1/0212; G05D 1/0287; G06V 20/58; H04N 23/66; H04N 23/54
See application file for complete search history.

(56) References Cited

U.S. PATENT DOCUMENTS

| | | | | |
|---|---|---|---|---|
| 5,912,980 | A * | 6/1999 | Hunke | G06V 40/161 |
| | | | | 348/169 |
| 7,565,157 | B1 * | 7/2009 | Ortega | H04W 4/029 |
| | | | | 455/414.3 |

(Continued)

FOREIGN PATENT DOCUMENTS

| | | |
|---|---|---|
| JP | 2013-134590 | 7/2013 |
| JP | 2018-169880 | 11/2018 |

(Continued)

OTHER PUBLICATIONS

Japanese Notice of Allowance for Japanese Patent Application No. 2021-161620 mailed Dec. 19, 2023.

(Continued)

*Primary Examiner* — Gertrude Arthur Jeanglaude
(74) *Attorney, Agent, or Firm* — Amin, Turocy & Watson, LLP

(57) ABSTRACT

A search system according to an embodiment is a search system including one or more boarding-type mobile objects moving within a predetermined area and a mobile object management server managing the boarding-type mobile objects and includes a receiver that receives registration of information on a search target, an imaging controller that activates an imager mounted on the one or more boarding-type mobile objects when the registration of the information on the search target is received by the receiver, an acquirer that acquires an image of surroundings of the boarding-type mobile object captured by the imager, and a determiner that determines whether the search target is included in the image acquired by the acquirer.

9 Claims, 13 Drawing Sheets

(51) Int. Cl.
*H04N 23/66* (2023.01)
*H04N 23/54* (2023.01)

(52) U.S. Cl.
CPC ............. *G06V 20/58* (2022.01); *H04N 23/66* (2023.01); *H04N 23/54* (2023.01)

(56) References Cited

U.S. PATENT DOCUMENTS

| | | | | |
|---|---|---|---|---|
| 8,588,527 | B2* | 11/2013 | Boncyk | G06V 20/10 |
| | | | | 382/181 |
| 8,737,986 | B2* | 5/2014 | Rhoads | G06F 3/011 |
| | | | | 455/426.1 |
| 2014/0205144 | A1* | 7/2014 | Inada | G06V 20/56 |
| | | | | 382/103 |
| 2016/0200394 | A1 | 7/2016 | Toya | |
| 2019/0197859 | A1* | 6/2019 | Kanehara | G06V 20/10 |
| 2021/0027060 | A1* | 1/2021 | Kanehara | G06V 20/10 |

FOREIGN PATENT DOCUMENTS

| | | |
|---|---|---|
| JP | 2019-117449 | 7/2019 |
| WO | 2015/125430 | 8/2015 |

OTHER PUBLICATIONS

Japanese Office Action for Japanese Patent Application No. 2021-161620 mailed Jul. 18, 2023.

\* cited by examiner

| AUTHENTICATION INFORMATION | | | ADDRESS | NAME | AGE | SEX | TERMINAL INFORMATION | BOARDING-TYPE MOBILE OBJECT INFORMATION | ... |
|---|---|---|---|---|---|---|---|---|---|
| USER ID | PASSWORD | ... | | | | | | | |
| 0001 | *** | ... | *** | AA | 21 | MALE | T111 | V001 | ... |
| 0002 | *** | ... | *** | BB | 10 | FEMALE | T123 | V005 | ... |
| ... | ... | ... | ... | ... | ... | ... | ... | ... | ... |

| MOBILE OBJECT ID | USER ID | POSITION INFORMATION | ... |
|---|---|---|---|
| V001 | 0001 | (X1, Y1) | ... |
| V002 | 0008 | (X2, Y2) | ... |
| V003 | 1020 | (X3, Y3) | ... |
| ... | ... | ... | ... |

| SEARCH TARGET | FEATURE INFORMATION | IMAGE INFORMATION | PLACE AND TIME INFORMATION | ... |
|---|---|---|---|---|
| GIRL | HEIGHT: * * *<br>CLOTH: * * * | * * * | AAA AREA<br>14:30 | ... |
| SUITCASE | SIZE: * * *<br>COLOR: * * * | * * * | * * * | ... |
| ... | ... | ... | ... | ... |

SEARCH SYSTEM, SEARCH METHOD, AND STORAGE MEDIUM

CROSS-REFERENCE TO RELATED APPLICATION

Priority is claimed on Japanese Patent Application No. 2021-161620, filed Sep. 30, 2021, the content of which is incorporated herein by reference.

BACKGROUND

Field of the Invention

The present invention relates to a search system, a search method, and a storage medium.

In the related art, a technology for detecting an image of a person from an image captured by an imaging means provided in an autonomous mobile object that moves according to a predetermined operation command, and determining whether the detected image of a person is an image of a search target person who meets predetermined search conditions is known (for example, Japanese Unexamined Patent Application No. 2019-117449).

SUMMARY

However, with the related art, the imaging means of the autonomous mobile object is always activated, which may cause discomfort to a user who is reluctant to be photographed. On the other hand, when photographing is stopped due to the user, data may not be collected and a target object cannot be searched for.

Aspects of the present invention have been made in consideration of such circumstances, and an object thereof is to provide a search system, a search method, and a program capable of more efficiently searching for a target object while suppressing discomfort to the user.

The search system, search method, and storage medium according to the present invention employ the following configurations.

(1): A search system according to an aspect of the present invention is a search system including one or more boarding-type mobile objects moving within a predetermined area and a mobile object management server managing the boarding-type mobile objects, the search system including: a receiver configured to receive registration of information on a search target; an imaging controller configured to activate an imager mounted on the one or more boarding-type mobile objects when the registration of the information on the search target is received by the receiver; an acquirer configured to acquire an image of surroundings of the boarding-type mobile object captured by the imager; and a determiner configured to determine whether the search target is included in the image acquired by the acquirer.

(2): In the aspect (1), the imaging controller notifies a user boarding the boarding-type mobile object with the imager mounted thereon of information indicating that the imager is to be activated or stopped, when the imaging controller activates or stops the imager.

(3): In the aspect (1), the imaging controller activates the imager of the boarding-type mobile object existing within an area in which the search target is estimated to exist among the one or more boarding-type mobile objects existing in the predetermined area.

(4): In the aspect (1), the acquirer acquires a position of the boarding-type mobile object, and the imaging controller notifies a requester requesting searching for the search target of information including a position of the search target and the image captured by the imager on the basis of position information of the boarding-type mobile object acquired by the acquirer, when the determiner determines that the search target is included in the image.

(5): In the aspect (4), the search system further includes an operation controller configured to move the boarding-type mobile object that the requester boards to the position of the search target when the requester boards the boarding-type mobile object.

(6): In the aspect (5), the operation controller moves the boarding-type mobile object so that the boarding-type mobile object tracks the search target when the search target moves.

(7): In the aspect (4), the acquirer acquires position information of the terminal device owned by a user boarding the boarding-type mobile object, and uses the acquired position information as the position information of the boarding-type mobile object.

(8): In the aspect (1), the imaging controller stops imaging of the imager of the boarding-type mobile object when the determiner determines that the search target is included in the image acquired by the acquirer.

(9): A search method according to an aspect of the present invention is a search method including: receiving registration of information on a search target by a computer of a mobile object management server managing one or more boarding-type mobile objects moving within a predetermined area; activating, by the computer, an imager mounted on the one or more boarding-type mobile objects when the registration of the information on the search target is received; acquiring, by the computer, an image of surroundings of the boarding-type mobile object captured by the imager; and determining, by the computer, whether the search target is included in the acquired image.

(10): A storage medium according to an aspect of the present invention is a computer-readable non-temporary storage medium having a program stored thereon, the program causing a computer of a mobile object management server managing one or more boarding-type mobile objects moving within a predetermined area to: receive registration of information on a search target; activate an imager mounted on the one or more boarding-type mobile objects when the registration of the information on the search target is received; acquire an image of surroundings of the boarding-type mobile object captured by the imager; and determine whether the search target is included in the acquired image.

According to the aspects (1) to (10), it is possible to search for a target object more efficiently while suppressing discomfort to the user.

BRIEF DESCRIPTION OF THE DRAWINGS

FIG. 2 is a diagram illustrating content of user information.

FIG. 3 is a diagram illustrating content of mobile object information.

FIG. 4 is a diagram illustrating content of search information.

DESCRIPTION OF EMBODIMENTS

Hereinafter, embodiments of a search system, search method, and storage medium of the present invention will be described with reference to the drawings. In the following description, a search system including a boarding-type mobile object that moves within a predetermined area with a user on board, and a mobile object management server that manages the boarding-type mobile object will be described. The predetermined area is, for example, an area of a facility having a predetermined size, such as a theme park, leisure land, amusement park, zoo, aquarium, or shopping mall. The predetermined area may be an area within a range designated by position information such as latitude and longitude.

[System Configuration]

Figure 1:
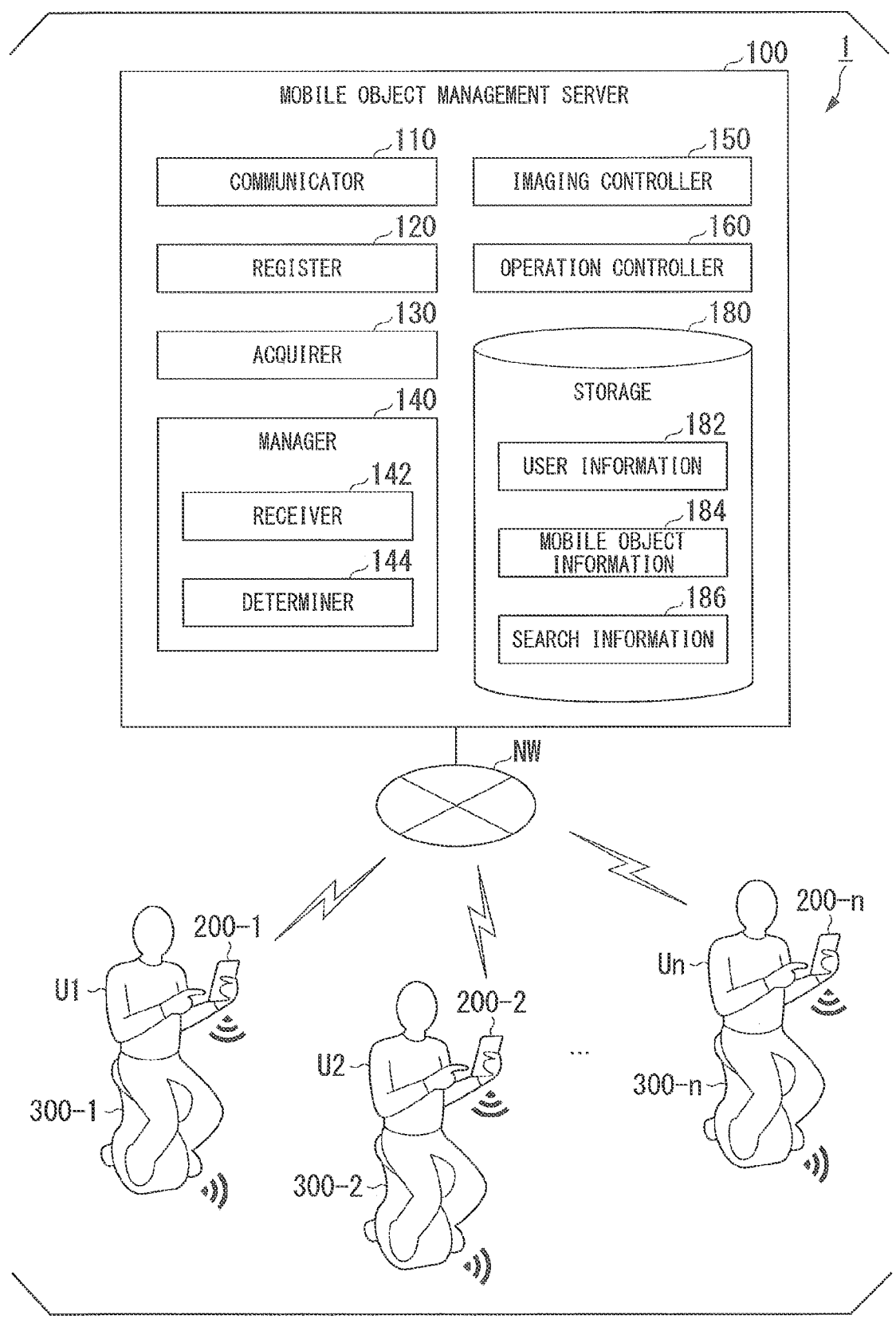
FIG. 1 is a configuration diagram of a search system according to an embodiment.

FIG. 1 is a configuration diagram of a search system 1 according to an embodiment. The search system 1 includes, for example, a mobile object management server 100, terminal devices 200-1 to 200-*n* of one or more users U1 to Un, and one or more boarding-type mobile objects 300-1 to 300-*n* which the respective users U1 to Un board. Hereinafter, each of the one or more users U1 to Un will be simply referred to as a "user U" in the description except for a case in which the users U1 to Un are described separately. The terminal devices 200-1 to 200-*n* and the boarding-type mobile objects 300-1 to 300-*n* are similarly referred to as "terminal device 200" and "boarding-type mobile objects 300" in the description. The mobile object management server 100 and the terminal device 200 can communicate with each other via the network NW, for example. The network NW includes the Internet, a wide area network (WAN), a local area network (LAN), a telephone line, a public line, a dedicated line, a provider device, a wireless base station, and the like. The mobile object management server 100 is an example of a "search device". The terminal device 200 and the boarding-type mobile object 300 can communicate with each other on the basis of, for example, Wi-Fi (registered trademark), Bluetooth (registered trademark), and other short-range wireless communication standards.

The mobile object management server 100 manages the user U who uses the boarding-type mobile object 300 or controls the operation of the boarding-type mobile object 300. The mobile object management server 100 manages the boarding-type mobile object 300 and the terminal device 200 of the user U in association with each other. The terminal device 200 is, for example, a mobile terminal that can be carried by the user U and can board the boarding-type mobile object 300, and is specifically a smartphone or a tablet terminal. The terminal device 200 is a terminal device owned by the user U. The boarding-type mobile object 300 is a mobile object that moves within a predetermined area with the user U on board. The boarding-type mobile object 300, for example, is lent from the service provider side in the search system 1 in order for the user U to move within the predetermined area. For example, the boarding-type mobile object 300 is a vehicle, a micro-mobility, a robot, or the like that can move in a state in which the user U is seated on the seat of the boarding-type mobile object 300 or a state in which the user U stands on the step of the boarding-type mobile object 300. The boarding-type mobile object 300 moves within the predetermined area or performs a predetermined operation in a state in which the user U is caused to board on the basis of an operation command based on an operation by the user U or an operation command from the mobile object management server 100. The predetermined operation includes movement of the boarding-type mobile object 300, photographing (imaging) of a camera (an example of an imager) provided in the boarding-type mobile object 300, and the like. Hereinafter, a case in which the predetermined area is a theme park will be described.

[Mobile Object Management Server]

The mobile object management server 100 includes, for example, a communicator 110, a register 120, an acquirer 130, a manager 140, an imaging controller 150, an operation controller 160, and a storage 180. The register 120, the acquirer 130, the manager 140, the imaging controller 150, and the operation controller 160 are realized by a hardware processor such as a central processing unit (CPU) executing a program (software). Some or all of these components may be realized by hardware (including circuitry) such as a large scale integration (LSI), an application specific integrated circuit (ASIC), a field-programmable gate array (FPGA), or a graphics processing unit (GPU), or may be realized by cooperation of software and hardware. The program may be stored in a storage device (a storage device including a non-transitory storage medium) such as a hard disk drive (HDD) or flash memory in advance, or may be stored in a removable storage medium (non-transitory storage medium) such as a DVD or CD-ROM and installed in a storage device of the mobile object management server 100 by the storage medium being mounted on a drive device or the like. The mobile object management server 100 may function as a cloud server that communicates with the terminal device 200 via the network NW and transmits or receives various pieces of data, for example.

The storage 180 can be realized by the various storage devices described above, a solid state drive (SSD), an electrically erasable programmable read only memory (EEPROM), a read only memory (ROM), a random access memory (RAM), or the like. User information 182, mobile object information 184, search information 186, programs, and various types of other information, for example, are stored in the storage 180. The storage 180 may store map information of theme park. Details of the user information 182, the mobile object information 184, and the search information 186 will be described below.

The communicator 110 communicates with the terminal device 200 and other external devices via the network NW.

The register 120 registers information on the user U who uses the search system 1. Specifically, the register 120 receives the information on the user U from the terminal device 200 and stores the received information in the user information 182 of the storage 180.

FIG. 2 is a diagram illustrating content of the user information 182. The user information 182 is, for example, information in which an address, name, age, sex, terminal information, boarding-type mobile object information, and the like are associated with authentication information for authenticating a user, for example, at the time of using the search system 1. The authentication information includes, for example, a user ID, a password, or the like, which are identification information for identifying a user. The authentication information may include biometric authentication information such as fingerprint information and iris information. The terminal information includes, for example, a terminal ID, which is identification information for identifying the terminal device 200 owned by the user U within a theme park, a telephone number, and an e-mail address. The boarding-type mobile object information includes, for example, a mobile object ID that is identification information for identifying the boarding-type mobile object communicating with the terminal device 200 of the user U through a short-range wireless communication scheme using Bluetooth or the like. The mobile object management server 100 communicates with the terminal device 200 on the basis of the terminal information, identifies the boarding-type mobile object 300 on the basis of the boarding-type mobile object information, and generates an individual operation command.

For example, when the register 120 receives a user registration request from the terminal device 200, the register 120 generates an image for inputting various types of information included in the user information 182, causes the terminal device 200 that has received the request to display the image, and acquires the user information input from the terminal device 200.

The register 120 may perform authentication of the user U who uses the service of the search system 1 on the basis of the registered user information 182. In this case, the register 120 performs authentication of the user U, for example, at a timing when a service use request is received from the terminal device 200. For example, when the register 120 receives the use request, the register 120 generates an authentication image for inputting authentication information such as a user ID and a password, causes the terminal device 200 that has made the request to display the generated image, and refers to the authentication information of the user information 182 on the basis of input authentication information input using the displayed image to determine whether or not to permit the use of the service (the search system 1) depending on whether authentication information matching the input authentication information is stored. For example, the register 120 performs processing for permitting the use of the service when the user information 182 includes the authentication information matching the input authentication information, and denying the use of the service when the user information 182 does not include the matching information, or performing new registration.

The acquirer 130 acquires information on the boarding-type mobile object 300 that the user U boards. For example, when the terminal device 200 is communicating with the boarding-type mobile object 300 using a near field communication scheme such as Bluetooth, the acquirer 130 acquires identification information (for example, the mobile object ID) of the boarding-type mobile object 300 which is communicating, identification information (terminal ID) of the terminal device 200, and the user ID from the terminal device 200. The acquirer 130 refers to the user ID of the user information 182 on the basis of the user ID, and stores the terminal ID and the mobile object ID in the terminal information and the boarding-type mobile object information associated with the matching user ID. This makes it possible for the mobile object management server 100 to manage a usage situation of the boarding-type mobile object 300.

The acquirer 130 acquires position information of the boarding-type mobile object 300 at predetermined timings (for example, for predetermined periods). For example, the acquirer 130 acquires position information of the terminal device 200 from the terminal device 200 communicating with the boarding-type mobile object 300 using a near field communication scheme, and uses the acquired position information as the position information of the boarding-type mobile object 300. The acquirer 130 stores the acquired position information in the storage 180 as the mobile object information 184.

FIG. 3 is a diagram illustrating content of the mobile object information 184. The mobile object information 184 is, for example, information in which a user ID and position information are associated with the mobile object ID. The position information stored in the mobile object information 184 may be, for example, latitude and longitude or may be a specific area (for example, an adventure area, a park area, a point of shopping area) further subdivided within a predetermined area (a theme park).

The acquirer 130 acquires images of the surroundings of the boarding-type mobile object 300 captured by the camera provided in the boarding-type mobile object 300 (for example, still images or moving images at predetermined time intervals).

The manager 140 manages a position or operation of the boarding-type mobile object 300 within the predetermined area and a usage situation of the user U, on the basis of the information acquired by the acquirer 130. The manager 140 may manage activation or stopping of the camera of the boarding-type mobile object 300. The manager 140 includes, for example, a receiver 142 and a determiner 144. The receiver 142 receives registration of a search target object in a theme park, and stores received information as the search information 186 in the storage 180.

FIG. 4 is a diagram illustrating content of the search information 186. The search target, feature information, image information, place and time information, and the like are associated with the search information 186. Examples of the search target include a person (for example, a child or an elderly person), an animal (for example, a dog or a cat), or a lost item (for example, a suitcase, bag, wallet, or umbrella) that is lost in the area. The feature information is information including an outer shape and appearance for specifying the search target. For example, when the search target is a person, the feature information is information including a plurality of feature elements (items) such as sex, height, age, clothing, hairstyle, whether or not a hat or glasses are being worn, and the like, and when the search target is an object such as a suitcase, the feature information is information including a plurality of feature elements such as a size, color, and manufacturer of the object. When there is image information as the search target, the manager 140 may generate feature information from the image information. In this case, the manager 140 performs well-known image processing (for example, binarization processing, edge detection processing, clustering processing, and image feature amount extraction processing) on the acquired image that is a search target to generate feature information for a search target portion. Information on a last sighting (or loss) place or time is stored in the place and time information.

The information included in the search information 186 described above may be registered, for example, from the terminal device 200 owned by a requester who requests a search (hereinafter referred to as a search requester) for a search target within a theme park. In this case, the manager 140 generates inquiry information for acquiring information stored in each item of the search information 186, transmits the inquiry information to the terminal device 200 of the search requester, and acquires an answer from the search requester. This makes it possible to acquire information that is effective for search.

The determiner 144 determines whether or not the search target is included in the image acquired by the acquirer 130. For example, the determiner 144 determines whether or not the search target is included in the captured image on the basis of a degree of matching between the feature information obtained by analyzing an image (captured image) of the surroundings captured by the camera, which has been acquired by the acquirer 130, and the feature information of the search target. The degree of matching may be derived, for example, from how many matching elements exist among a plurality of feature elements included in the feature information, or may be derived from a degree of similarity of each feature element or the entire feature information. The degree of matching may be derived, for example, on the basis of a sum of differences for each element. The degree of matching may be derived from two pieces of information to be compared using artificial intelligence (AI) functions such as machine learning (neural network) or deep learning, and may be derived from other schemes.

When the manager 140 receives the information on the search target, the imaging controller 150 selects the boarding-type mobile object 300 whose camera (an example of an imager) is to be operated from among one or more boarding-type mobile objects 300 existing in a theme park on the basis of, for example, position information of the search target. The camera mounted on the selected boarding-type mobile object 300 is operated to capture an image of the surroundings of the boarding-type mobile object 300. The imaging controller 150 may perform control to limit a direction in which the camera performs imaging to a specific direction (for example, a forward direction of the boarding-type mobile object 300). The imaging controller 150 may perform control to brighten the surroundings by causing a light emitter mounted on the boarding-type mobile object 300 to emit light at the time of imaging when the surroundings are dark (or are in a dark time period). The imaging controller 150 may perform control to stop the camera that is imaging under the control of the manager 140.

The operation controller 160 generates information (operation control information) for causing the boarding-type mobile object 300 existing in the predetermined area that has become an imaging target by the imaging controller 150 to execute a predetermined operation or to stop (end) the execution and transmits the generated information to the terminal device 200. The predetermined operation is at least one of an operation of moving the boarding-type mobile object 300, an operation of activating the camera of the boarding-type mobile object 300, an operation of causing the light emitter to emit light (turn on or blink), and an operation of outputting sound. The operation controller 160 may transmit map information of the area (theme park) and the like to the terminal device 200 in addition to (or instead of) the operation control information.

When the operation controller 160 activates or stops the camera of the boarding-type mobile object 300, the operation controller 160 generates information indicating that the camera is to be activated or stopped, and transmits the generated information to terminal device 200 to notify the user U that has boarded the boarding-type mobile object 300 with the camera mounted thereon.

[Terminal Device]

Figure 5:
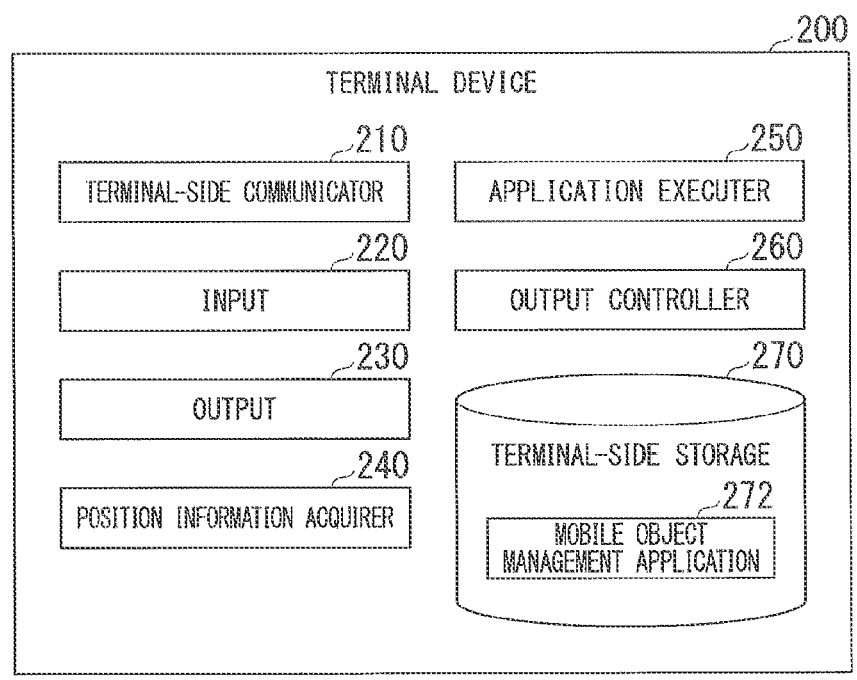
FIG. 5 is a configuration diagram of a terminal device according to an embodiment.

Next, a configuration of the terminal device 200 will be described. FIG. 5 is a configuration diagram of the terminal device 200 of the embodiment. The terminal device 200 includes, for example, a terminal-side communicator 210, an input 220, an output 230, a position information acquirer 240, an application executer 250, an output controller 260, and a terminal-side storage 270. The position information acquirer 240, the application executer 250, and the output controller 260 are realized by, for example, a hardware processor such as a CPU executing a program (software). Some or all of these components may be realized by hardware (including circuitry) such as an LSI, ASIC, FPGA, or GPU or may be realized by cooperation of software and hardware. The program may be stored in advance in a storage device such as an HDD or a flash memory (a storage device including a non-transitory storage medium), or may be stored in a removable storage medium (non-transitory storage medium) such as a DVD or a CD-ROM and installed in a storage device of the terminal device 200 by the storage medium being mounted on a drive device, card slot, or the like. The application executer 250 and the output controller 260 are examples of a "notifier".

The terminal-side storage 270 may be realized by various storage devices described above, an EEPROM, a ROM, a RAM, or the like. The terminal-side storage 270 stores, for example, a mobile object management application (search application) 272, programs, and various types of other information.

The terminal-side communicator 210, for example, communicates with the mobile object management server 100, the boarding-type mobile object 300, and other external devices using the network NW. The terminal-side communicator 210 may include, for example, a near field communication function for performing wireless communication on the basis of Wi-Fi, Bluetooth, dedicated short range communication (DSRC), and other communication standards or executing near field communication (NFC) with the boarding-type mobile object 300.

The input 220 receives an input from the user U through operation with respect to various keys and buttons, for example. The input 220 may include a voice input such as a microphone, and input a voice of the user U or a sound around the terminal device 200 through the voice input. The output 230 outputs information to the user U. The output 230 is, for example, a display or a speaker (audio output). The display is, for example, a liquid crystal display (LCD) or an organic electro luminescence (EL) display. The input 220 may be configured integrally with the display as a touch panel. The display displays various types of information in the embodiment under the control of the output controller 260. The speaker outputs a predetermined sound (voice, music, warning sound, effect sound, or the like) under the control of the output controller 260, for example.

The position information acquirer 240 acquires the position information of the terminal device 200 using, for example, a built-in global positioning system (GPS) device (not illustrated). The position information includes, for example, latitude and longitude.

The application executer 250 is realized by the mobile object management application 272 stored in the terminal-side storage 270 being executed. The mobile object management application 272 is downloaded from an external device via the network NW and installed in the terminal device 200, for example. The mobile object management application 272 is an application program that controls the output controller 260 so that notification to the user U is performed by causing the display to display an image provided by the mobile object management server 100 or the notification is performed causing sound corresponding to information provided by the mobile object management server 100 to be output from the speaker.

The application executer 250 transmits, for example, information input by the input 220 and information stored in the terminal-side storage 270 to the mobile object management server 100 or the boarding-type mobile object 300 via the terminal-side communicator 210. The information input by the input 220 includes, for example, information on the registration and authentication of the user U. The application executer 250 transmits the information (the operation control information) obtained from the mobile object management server 100, the position information of the terminal device 200, the map information, or the like to the boarding-type mobile object 300 that the user U boards, or transmits information obtained from the boarding-type mobile object 300 to the mobile object management server 100 together with the user ID or the position information.

The output controller 260 controls content or a display aspect of an image that is displayed on the display of the output 230, and content or an output aspect of sound that is output to the speaker, under the control of the application executer 250.

[Boarding-Type Mobile Object]

Figure 6:
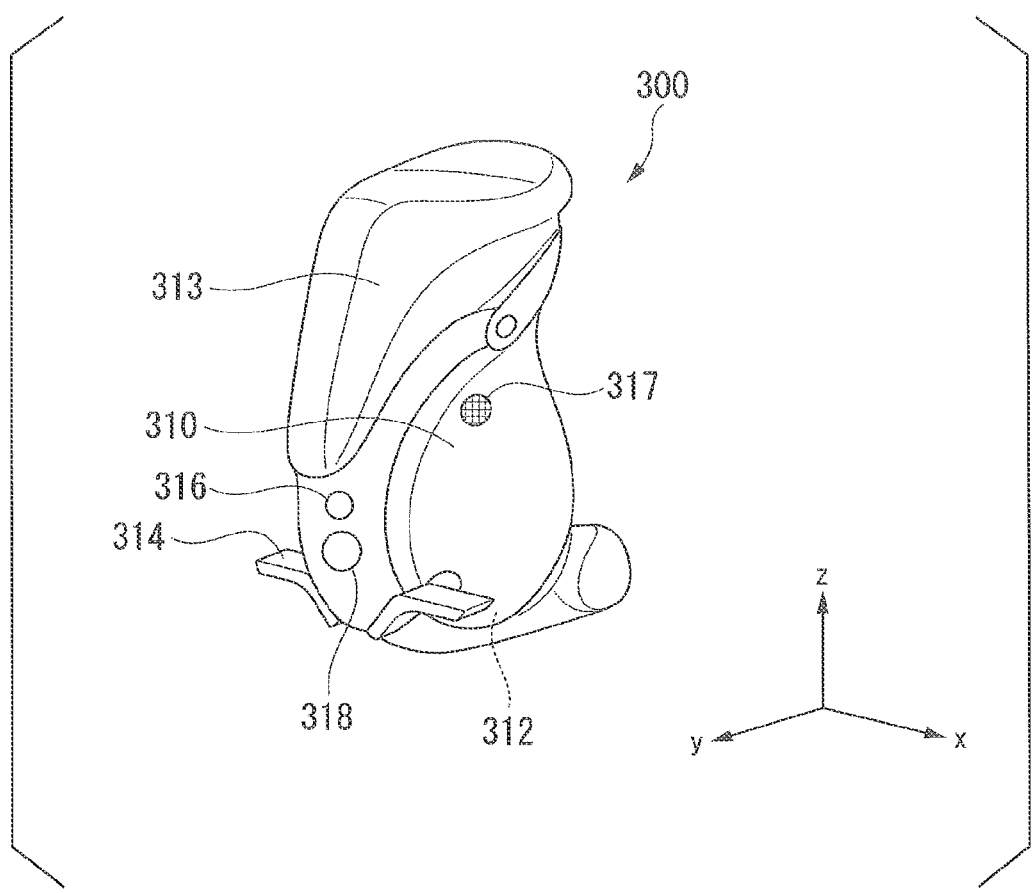
FIG. 6 is a perspective view illustrating an appearance of a boarding-type mobile object of an embodiment.

Next, the boarding-type mobile object 300 will be described. FIG. 6 is a perspective view illustrating an appearance of the boarding-type mobile object 300 of the embodiment. In FIG. 6, a width direction of the boarding-type mobile object 300 is called an x direction, a front-rear direction is called a y direction, and an up-down direction is called a z direction. The forward direction of the boarding-type mobile object 300 is a positive direction of a y-axis (a direction from the back side of the paper to the front side of the paper; hereinafter referred to as a +y-axis direction), and a backward direction is a negative direction of the y-axis (a direction from the front side of the paper to the back side of the paper; hereinafter referred to as a −y-axis direction).

The boarding-type mobile object 300 illustrated in FIG. 6 includes, for example, a base 310, an omnidirectional moving wheel 312, a seat 313, and a step 314. The inside of the base 310 is covered with, for example, a cover panel made of resin. An internal configuration of the base 310 will be described below.

Figure 7:
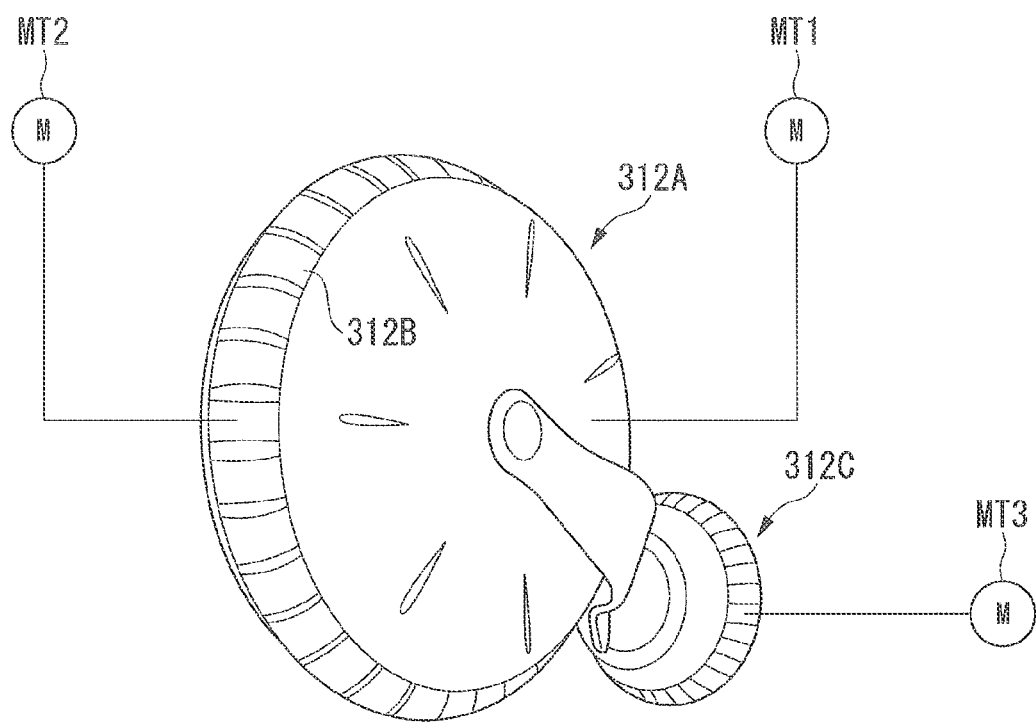
FIG. 7 is a perspective view of an omnidirectional moving wheel.

FIG. 7 is a perspective view of the omnidirectional moving wheel 312. The omnidirectional moving wheel 312 includes a large-diameter wheel 312A, a small-diameter wheel 312B, a turning wheel 312C, a first motor MT1, a second motor MT2, and a third motor MT3. The large-diameter wheel 312A is a wheel rotatable around the x-axis. The large-diameter wheel 312A is rotated by the first motor MT1.

The small-diameter wheel 312B is a wheel that can rotate around an axis perpendicular to a straight line in a radial direction in a center section in a width direction of the large-diameter wheel 312A. The omnidirectional moving wheel 312 includes a plurality of small-diameter wheels 312B. The plurality of small-diameter wheels 312B are arranged at approximately equal intervals in a circumferential direction of the large-diameter wheel 312A. The plurality of small-diameter wheels 312B are rotated all at once by the second motor MT2.

The turning wheel 312C is a wheel that can rotate around the y-axis. The turning wheel 312C has a smaller diameter than the large-diameter wheel 312A. The turning wheel 312C is rotated by the third motor MT3. The omnidirectional moving wheel 312 moves the boarding-type mobile object 300 by causing at least one of the large-diameter wheel 312A, the small-diameter wheel 312B, and the turning wheel 312C to rotate. Details of an operation of the omnidirectional moving wheel 312 will be described below.

The seat 313 is attached above the base 310. The seat 313 is a member on which the user U riding the boarding-type mobile object 300 is seated. The step 314 is attached to a lower front portion of the base 310. The step 314 is a member on which the user U places legs. The seat 313 and the step 314 are adjustable in width and height.

The boarding-type mobile object 300 may include a light emitter 316 such as a lamp, a speaker 317 for outputting sound, and the like. The light emitter 316 can turn on or blink with light in one or more predetermined colors. The speaker 317 outputs predetermined sound (voice, music, warning sounds, sound effects, or the like). One or more light emitters 316 and one or more speakers 317 may be attached to arbitrary locations of the boarding-type mobile object 300, and are not limited to attachment positions illustrated in FIG. 6.

A camera (an example of an imager) 318 may be provided in the boarding-type mobile object 300. The camera 318 is, for example, a digital camera using a solid-state imaging device such as a charge coupled device (CCD) or a complementary metal oxide semiconductor (CMOS). The camera 318, for example, periodically and repeatedly images the surroundings of the boarding-type mobile object 300 (surroundings including at least the front of the boarding-type mobile object 300). The camera 318 may be a stereo camera or may include a night vision camera. One or more cameras 318 may be attached to arbitrary locations on the boarding-type mobile object 300, and are not limited to a position illustrated in FIG. 6.

Figure 8:
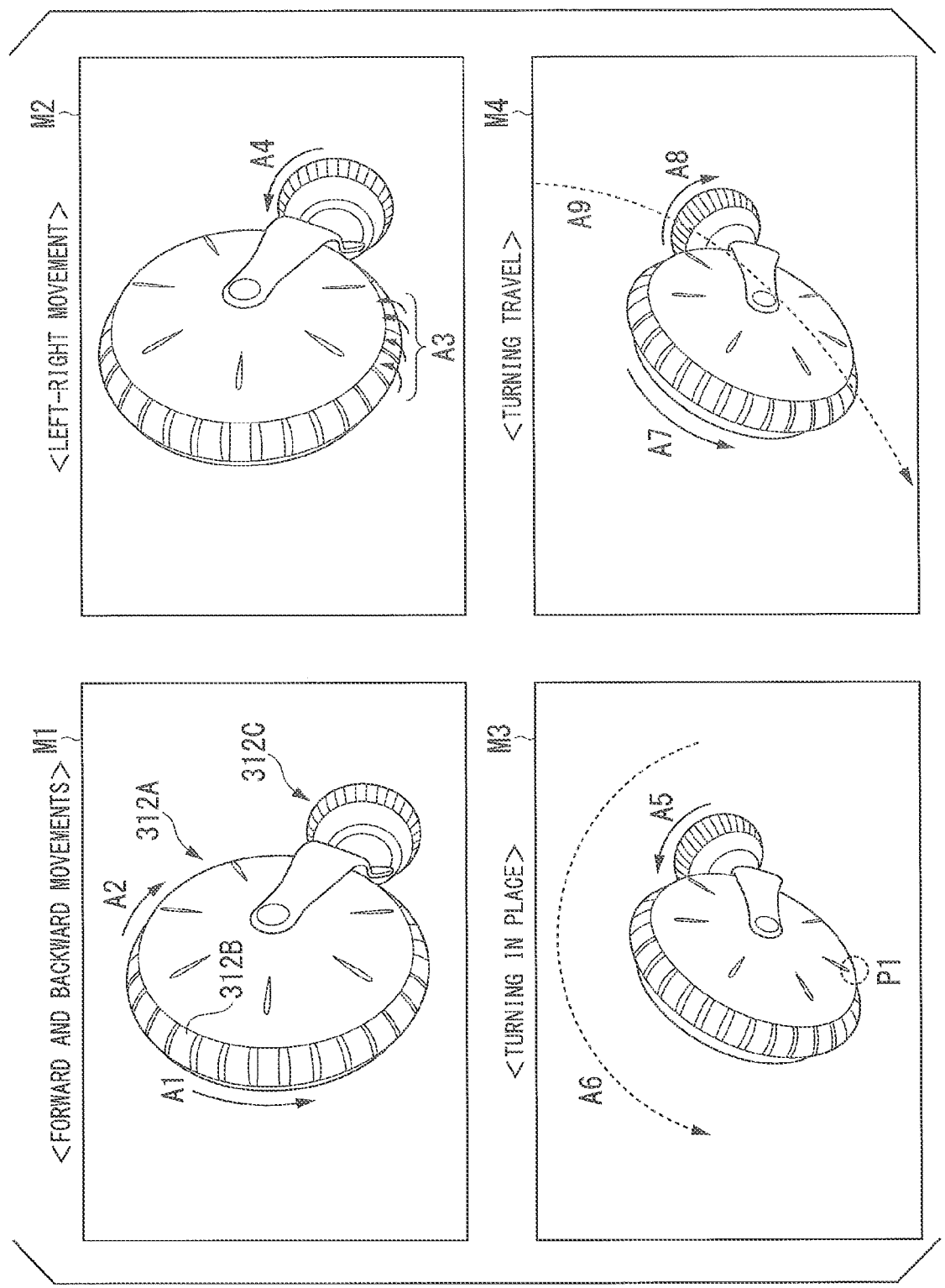
FIG. 8 is a diagram illustrating details of an operation of an omnidirectional moving wheel of the boarding-type mobile object.

Next, details of the operation of the omnidirectional moving wheel 312 of the boarding-type mobile object 300 will be described. FIG. 8 is a diagram illustrating the details of the operation of the omnidirectional moving wheel 312 of the boarding-type mobile object 300. The omnidirectional moving wheel 312 is a wheel that enables the boarding-type mobile object 300 to move forward in any direction (all directions of 360 degrees) from the current position without performing a preliminary operation such as turning. The omnidirectional moving wheel 312 includes, for example, the large-diameter wheel 312A as a front wheel and the turning wheel 312C as a rear wheel, and includes the plurality of small-diameter wheels 312B in a ground portion (a portion of an edge in a radial direction) of the large-diameter wheel 312A of the front wheel.

The large-diameter wheel 312A is a wheel that mainly realizes forward and backward movements in the front-rear direction. The small-diameter wheel 312B is a wheel that mainly realizes lateral movement in place by rotating around a rotation direction (circumferential direction) of the large-diameter wheel 312A. On the other hand, the turning wheel 312C of the rear wheel has a smaller diameter than the large-diameter wheel 312A, and is a wheel that mainly realizes turning movement by rotating on a rotation axis perpendicular to the rotation axis of the large-diameter wheel 312A.

The omnidirectional moving wheel 312 includes motors MT1 to MT3 capable of independently controlling the rotation of the large-diameter wheel 312A, small-diameter wheels 312B, and turning wheel 312C described above. With such a configuration, the omnidirectional moving wheel 312 can realize not only movements in various directions such as sideways and diagonally, but also agile movements such as bending or turning in place, by using a difference in speed of movement in a lateral direction between the front and rear wheels, in addition to the forward and backward movements.

Here, the forward direction of the boarding-type mobile object 300 is a positive direction of a y-axis (a direction from the back side of the paper to the front side of the paper; hereinafter referred to as a +y-axis direction) in FIG. 8, and the backward direction is a negative direction of the y-axis (a direction from the front side of the paper to the back side of the paper; hereinafter referred to as a −y-axis direction). For example, as shown in an operation example M1 (forward and backward movements) in FIG. 8, the omnidirectional moving wheel 312 moves forward when the large-diameter wheel 312A is caused to rotate in a direction of an arrow A1, and moves backward when the large-diameter wheel 312A is caused to rotate in a direction of an arrow A2.

As shown in an operation example M2 (a left-right movement) in FIG. 8, the omnidirectional moving wheel 312 can move leftward in place without changing the direction by causing the small-diameter wheel 312B to rotate in a direction of an arrow A3. In this case, the turning wheel 312C may be configured to naturally rotate in a direction of an arrow A4 according to a movement in the left-right direction, or may be controlled to rotate in the direction of an arrow A4 according to an amount of rotation of the small-diameter wheel 312B. The omnidirectional moving wheel 312 can move rightward in place without changing the direction by causing the small-diameter wheel 312B to rotate in a direction opposite to the arrow A3. The left direction here is a left direction in FIG. 6 and corresponds to a negative direction (−x-axis direction) of the x-axis, and the right direction is a right direction in FIG. 6 and corresponds to a positive direction (+x-axis direction) of the x-axis. The plurality of small-diameter wheels 312B may be configured so that all the wheels rotate at the same time, or may be configured so that only the wheels in the ground portion rotate.

As shown in an operation example M3 (turning in place) in FIG. 8, the omnidirectional moving wheel 312 can turn in a direction of an arrow A6 in place around a contact point P1 of the large-diameter wheel 312A by causing the turning wheel 312C to rotate in a direction of an arrow A5, and can turn in a direction opposite to the arrow A6 in place by causing the turning wheel 312C to rotate in a direction opposite to the arrow A5.

As shown in an operation example M4 (turning travel) in FIG. 8, the omnidirectional moving wheel 312 can move forward while turning in a direction of an arrow A9 by causing the large-diameter wheel 312A to rotate in a direction of an arrow A7 and causing the turning wheels 312C to rotate in the direction of the arrow A8 (turning travel). The omnidirectional moving wheel 312 can move backward while turning in a direction opposite to the arrow A9 by causing the large-diameter wheel 312A to rotate in a direction opposite to the arrow A7 and causing the turning wheel 312C to rotate in a direction opposite to the arrow A8. In this example, the omnidirectional moving wheel 312 can move forward or backward with a turning center set to the right by causing the turning wheel 312C to rotate in the direction opposite to the arrow A8.

A method of realizing the omnidirectional moving wheel 312 is not limited to the method of FIG. 8. The omnidirectional moving wheel 312 may be realized with any existing technology. The boarding-type mobile object 300 may include one omnidirectional moving wheel 312 or may include a plurality of omnidirectional moving wheels 312. Further, the boarding-type mobile object 300 may include normal wheels as auxiliary wheels, in addition to the omnidirectional moving wheel 312.

Figure 9:
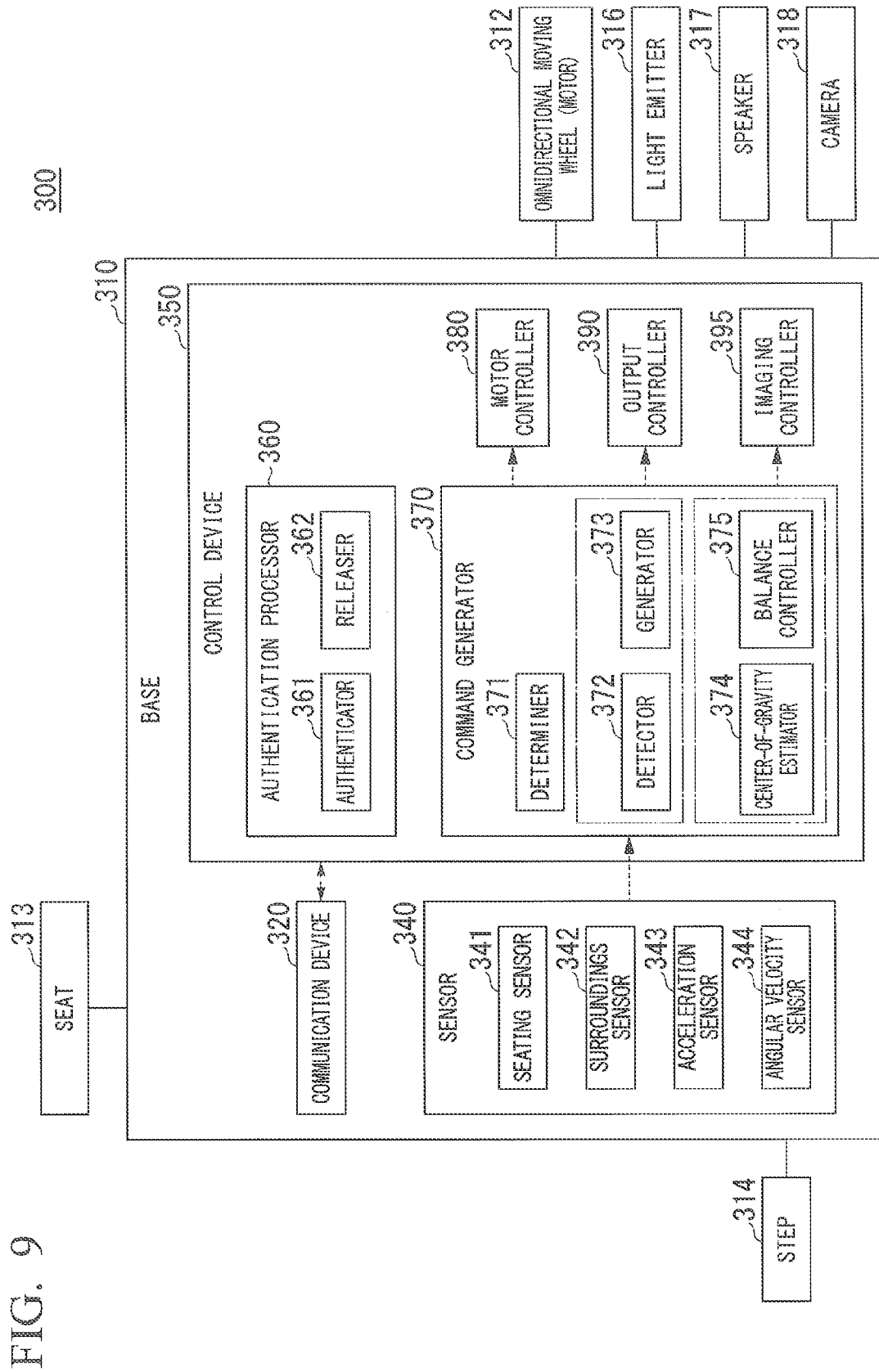
FIG. 9 is a configuration diagram illustrating an example of a boarding-type mobile object.

Next, a functional configuration of the boarding-type mobile object 300 will be described. FIG. 9 is a configuration diagram illustrating an example of the boarding-type mobile object 300. The boarding-type mobile object 300 includes, for example, a communication device 320, a sensor 340, and a control device 350. The communication device 320, the sensor 340, and the control device 350 are provided in a base 310, for example. The boarding-type mobile object 300 includes the omnidirectional moving wheels 312, the seat 313, the step 314, the light emitter 316, the speaker 317, and the camera 318, for example, in addition to the base 310.

The communication device 320 performs wireless communication on the basis of, for example, Wi-Fi, Bluetooth, DSRC, and other communication standards. The communication device 320 receives an electrical signal transmitted by the terminal device 200 and outputs the electrical signal to the control device 350. The communication device 320 transmits the electrical signal output by the control device 350 to the terminal device 200. A near field communication function for executing near field communication (NFC) with the terminal device 200 may be included instead of (or in addition to) the communication device 320.

The sensor 340 includes, for example, a seating sensor 341, a surroundings sensor 342, an acceleration sensor 343, and an angular velocity sensor 344. The seating sensor 341 detects a seating state of whether or not the user U (passenger) is seated on the seat 313. The seating sensor 341 outputs a seating signal indicating the seating state of the user U to the control device 350.

The surroundings sensor 342 is a sensor that detects an object around the boarding-type mobile object 300. The surroundings sensor 342 detects, for example, a distance between the detected object and the boarding-type mobile object 300. The surroundings sensor 342 outputs to the control device 350 a surrounding object signal regarding the detected object and the distance between the detected object and the boarding-type mobile object 300. The surroundings sensor 342 may be, for example, an ultrasonic sensor with ultrasonic waves as a medium, may be an optical sensor with light as a medium, or may be an image sensor that captures an image of the surroundings of the boarding-type mobile object 300. The image sensor may be configured integrally with the camera 318.

The acceleration sensor 343 is attached to one or more arbitrary locations on the base 310 or the seat 313. The acceleration sensor 343 detects acceleration acting on the attachment location and outputs the acceleration to the control device 350. The angular velocity sensor (gyro sensor) 344 is attached to one or more arbitrary locations on the base 310 or the seat 313. The angular velocity sensor 344 detects angular velocity acting on the attachment location and outputs the angular velocity to control device 350.

The control device 350 controls the operation of the boarding-type mobile object 300 on the basis of information obtained from the communication device 320 and the sensor 340. The control device 350 includes, for example, an authentication processor 360, a command generator 370, a motor controller 380, an output controller 390, and an imaging controller 395. The authentication processor 360 includes, for example, an authenticator 361 and a releaser 362. The command generator 370 includes, for example, a determiner 371, a detector 372, a generator 373, a center-of-gravity estimator 374, and a balance controller 375.

These components are realized, for example, by a hardware processor such as a CPU executing a program (software). Some or all of these components may be realized by hardware (including circuitry) such as an LSI, an ASIC, an FPGA, or a GPU, or may be realized by cooperation of software and hardware. The program may be stored in a storage device (a storage device including a non-transitory storage medium) such as an HDD or a flash memory provided in the boarding-type mobile object 300 in advance, or may be stored in a storage device (non-transitory storage medium) such as a DVD or a CD-ROM and installed in the storage device by the storage medium being mounted in a drive device. A mobile object ID assigned to the own vehicle, a terminal ID obtained from the terminal device 200, the position information, the map information, the operation command, and the like may be stored in the storage device.

The authenticator 361 performs authentication of the user U who boards (or is boarding) the boarding-type mobile object 300. The authenticator 361 performs near field communication with the terminal device 200 existing in the surroundings (within a predetermined distance) using Bluetooth or the like, acquires information on the terminal device 200 (for example, a terminal ID or a user ID) using the terminal device 200 with which communication has been established first or the closest terminal device 200, and sets a usage right for the user U owning the terminal device 200 on the basis of the acquired information. For example, when a determination is made using the seating sensor 341 that the user U is seated on the seat 313, the authenticator 361 may perform the above authentication. When the usage right is set, the terminal device 200 and the boarding-type mobile object 300 are in communication. The authenticator 361 does not communicate with other terminal devices 200 when the usage right is set for one user U (when the usage right is not released) (that is, when the usage right is not set for a plurality of users).

The releaser 362 measures an elapsed time after the user U leaves the boarding-type mobile object 300. After the user U leaves the boarding-type mobile object 300 and a predetermined time has elapsed, the releaser 362 regards a release condition as being satisfied and releases the usage right of the user U for the boarding-type mobile object 300. The predetermined time may be constant or may be a time that varies depending on specific conditions. The specific conditions may be, for example, a stop position of the boarding-type mobile object 300, a time period, the number of people who visited the specific area in a theme park with the user U, a relationship between people such as family members or friends. Other conditions may be used as the release condition. For example, the release condition may be that the user U performs an operation indicating an intention to release the usage right and the releaser 362 acquires a signal according to the operation.

The command generator 370 generates, for example, an operation control or output control command for the boarding-type mobile object 300. The determiner 371 determines whether or not the user U is seated, on the basis of the seating signal output from the seating sensor 341. The determiner 371 may determine that the user U has left the boarding-type mobile object 300 when a determination is made that the user U is not seated on the seat 313 after determining that the user U is seated on the seat 313 on the basis of the seating signal.

The detector 372 detects content of an operation of the user U with respect to the boarding-type mobile object 300 and the operation control information acquired from the terminal device 200. The detector 372 may detect a situation of the surroundings of the boarding-type mobile object 300 detected by the surroundings sensor 342. The situation of the surroundings is, for example, information on, for example, a position at which the boarding-type mobile object 300 exists in a theme park on the basis of other boarding-type mobile objects 300 existing in the surroundings, the map information, and the position information of the terminal device 200.

The generator 373 generates various commands for the boarding-type mobile object 300. For example, the generator 373 generates a command for causing the imaging controller 395 to activate the camera 318 or stop imaging on the basis of the operation control information from the mobile object management server 100 acquired from the terminal device 200, outputs the generated command to the imaging controller 395. The generator 373 generates a command for causing the light emitter 316 to turn on or blink with light in a predetermined color, or a command for causing the speaker to output a predetermined sound (a sound, musical instrument sound, or alarm) on the basis of the operation control information, and outputs the generated command to the output controller 390. The generator 373 generates a command for moving the boarding-type mobile object 300 without depending on an operation of the user U on the basis of the operation control information, and outputs the generated command to the motor controller 380.

The center-of-gravity estimator 374 and the balance controller 375 function mainly when the user U boards the boarding-type mobile object 300. The center-of-gravity estimator 374 estimates a center of gravity of an object including the user U boarding on the boarding-type mobile object 300, the base 310, and the seat 313 on the basis of outputs of the acceleration sensor 343 and the angular velocity sensor 344.

The balance controller 375 generates direction control information (operation command) for returning a position of the center of gravity estimated by the center-of-gravity estimator 374 to a reference position (a position of the center of gravity in a stationary state). For example, the balance controller 375 generates information (command) for instructing acceleration to rear right when the position of the center of gravity is biased to the rear right from the reference position. When an operation (action command) performed by the user U is acceleration forward movement and the position of the center of gravity is behind the reference position, the balance controller 375 may suppress the acceleration so that the position of the center of gravity is not biased further back due to the acceleration forward movement or may guide the position of the center of gravity forwardly through one backward movement and then start accelerating forward movement. The command generator 370 outputs the control (command) generated by the balance controller 375 to the motor controller 380.

The motor controller 380 individually controls each motor attached to the omnidirectional moving wheel 312 on the basis of the control information output by the command generator 370. For example, the motor controller 380 may execute different controls in a case in which the user U boards the boarding-type mobile object 300 and when the user U boards (is seated) the boarding-type mobile object 300 and when the user U does not board the boarding-type mobile object 300.

When the user U boards the boarding-type mobile object 300, the user U boarding the boarding-type mobile object 300 can move the boarding-type mobile object 300 in a desired direction by moving the center of gravity in the desired direction according to change in the posture of the user U under such control. That is, the boarding-type mobile object 300 recognizes the movement of the center of gravity of the user U as a steering operation with respect to the boarding-type mobile object 300 and performs a movement operation according to the steering operation.

The output controller 390 causes the light emitter 316 to turn on or blink with light in a predetermined color, or causes the speaker 317 to output a predetermined sound (vocal sound, music, warning sound, sound effect, or the like) on the basis of the control information output by the command generator 370.

The imaging controller 395 controls activation or stopping of the camera 318. The imaging controller 395 transmits the image captured by the camera 318 to the terminal device 200 via the communication device 320.

Functions that are executed by the boarding-type mobile object 300 are executed by power supplied from a battery (not illustrated) mounted inside. The battery may be charged by a charging device provided outside the boarding-type mobile object 300, or may be detachable so that the battery can be replaced with another battery. The battery can also be charged with electricity regenerated by a motor of the omnidirectional moving wheel 312.

[Processing Executed by Search System]

Figure 10:
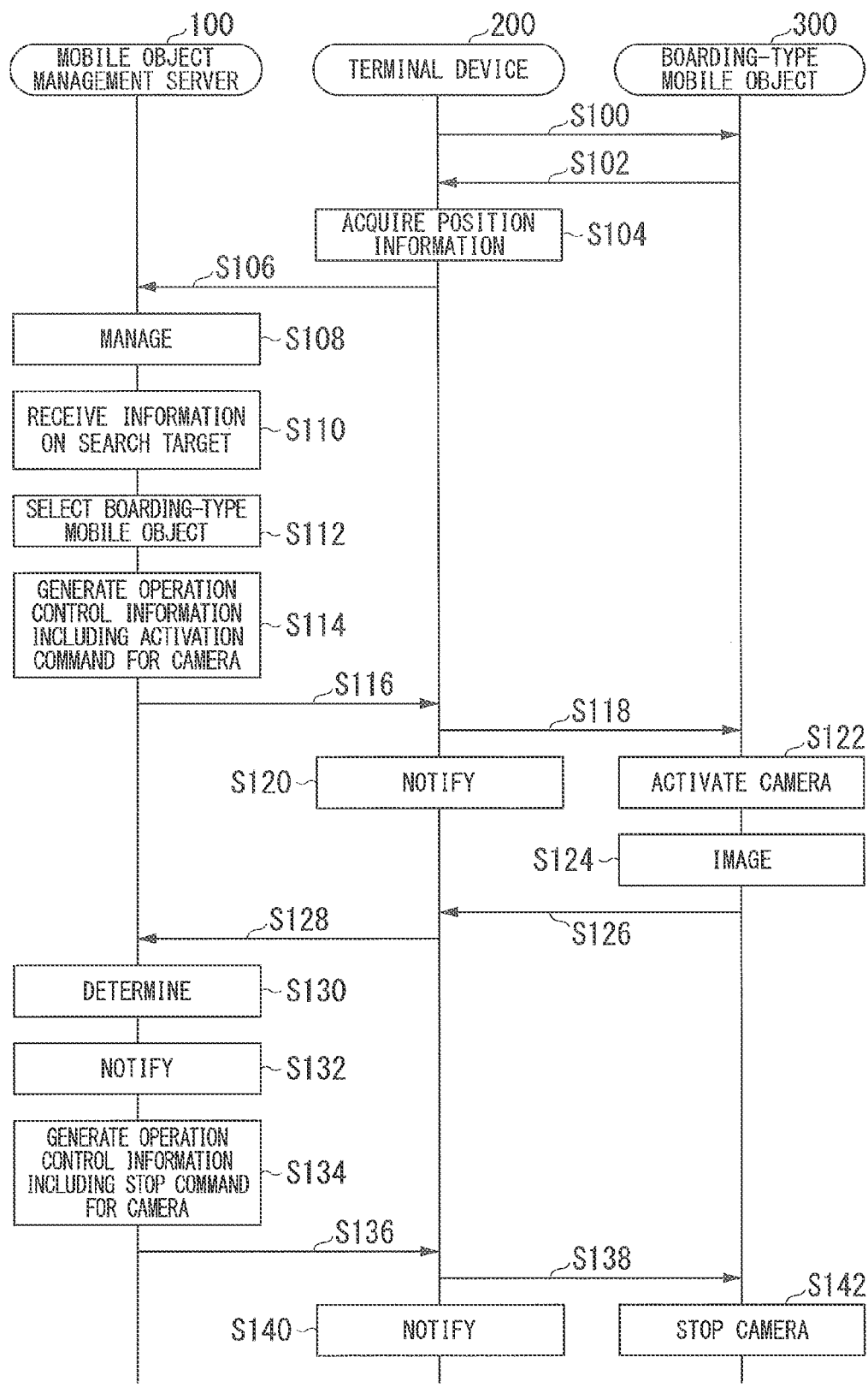
FIG. 10 is a sequence diagram illustrating an example of processing that is executed by a search system.

Next, processing that is executed by the search system 1 will be described. FIG. 10 is a sequence diagram illustrating an example of processing that is executed by the search system 1. In the example of FIG. 10, for convenience of explanation, one mobile object management server 100, terminal device 200, and boarding-type mobile object 300 are used for explanation, but the same processing is executed for other terminal devices and boarding-type mobile object 300 that satisfy conditions. In the example of FIG. 10, it is assumed that authentication processing is performed between the terminal device 200 and the mobile object management server 100, and permission to use a service provided by the search system 1 is obtained for the user U of the terminal device 200.

In the example of FIG. 10, when the user U boards the boarding-type mobile object 300, the terminal device 200 performs communication with the boarding-type mobile object 300 through near field communication using Bluetooth or the like (step S100), and acquires the identification information (the mobile object ID) of the boarding-type mobile object 300 when the communication is established (when the use is permitted) (step S102). Next, the position information acquirer 240 of the terminal device 200 acquires the position information of the terminal device 200 (step S104). Next, the terminal device 200 transmits the acquired position information, the terminal ID, and the mobile object ID to the mobile object management server 100 (step S106). The mobile object management server 100 manages the position information of the terminal device 200 acquired by the terminal device 200 as the position information of the boarding-type mobile object 300 (step S108). The processing of steps S104 to S108 may be repeatedly executed at a predetermined cycle while the terminal device 200 and the boarding-type mobile object 300 are connected through near field communication.

Next, the receiver 142 of the mobile object management server 100 receives the information on the search target from the search requester (step S110). Next, the imaging controller 150 selects a boarding-type mobile object whose camera is to be activated, on the basis of the received information (step S112).

Figure 11:
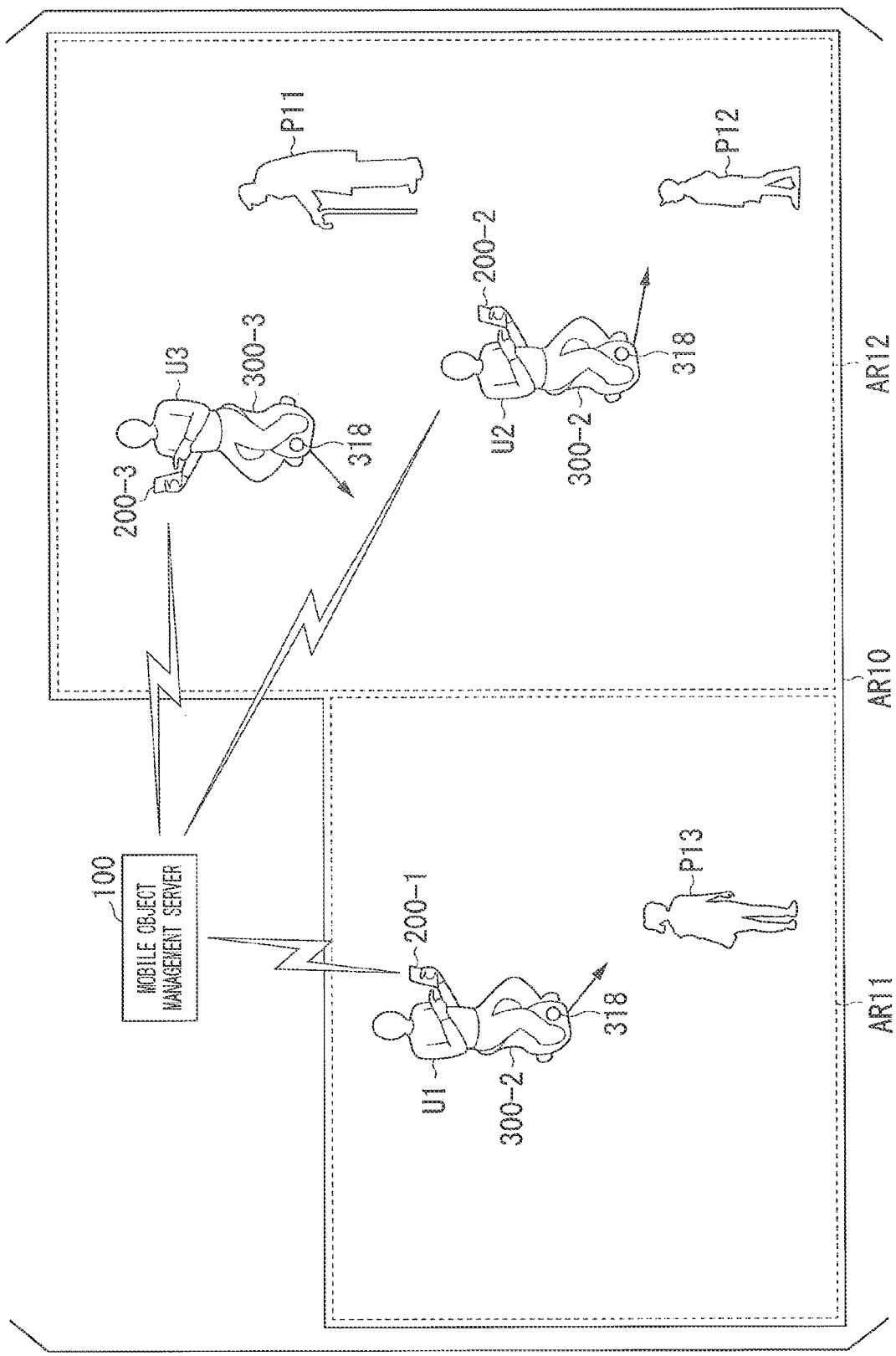
FIG. 11 is a diagram illustrating selection of a boarding-type mobile object whose camera is to be activated from among one or more boarding-type mobile objects existing within a predetermined area.

FIG. 11 is a diagram illustrating selection of the boarding-type mobile object 300 whose camera 318 is to be activated from among one or more boarding-type mobile objects 300 existing within a predetermined area. An example of FIG. 11 schematically shows a plurality of boarding-type mobile objects 300 existing within a predetermined area AR10. Hereinafter, a case in which the predetermined area AR10 is a theme park and the search target is a lost child (a person P12 among persons P11 to P13 in the figure) will be described. The predetermined area AR10 includes divided areas (specific areas smaller than the predetermined area AR10 in size) further subdivided according to, for example, content or types of themes. In the example of FIG. 11, the area AR10 includes two divided areas AR11 and AR12.

The operation controller 160 selects the boarding-type mobile object 300 whose camera 318 is to be activated, on the basis of the place and time information or the feature information included in the information on the search target (the search information 186). For example, when a child gets lost in the divided area AR12, the operation controller 160 estimates that the lost child exists in the divided area AR12, and selects the boarding-type mobile objects 300-2 and 300-3 existing in the divided area AR12 as targets whose camera 318 is to be activated. When the feature information indicates that the lost child is a girl, the operation controller 160 may estimate that the girl exists in a divided area (for example, a princess area) corresponding to a theme that the girl likes, and select the boarding-type mobile object 300 existing in the area as a target whose camera 318 is to be activated. When a predetermined time or more has passed since a sight loss time included in the place and time information, the operation controller 160 selects all boarding-type mobile objects 300-1 to 300-3 existing within the area AR10 as targets whose camera 318 is to be activated.

Referring back to FIG. 10, the mobile object management server 100 generates operation control information including an activation command for activating the selected camera 318 of the boarding-type mobile object 300 (step S114), and transmits the generated operation control information to the terminal device 200 with which the selected boarding-type mobile object 300 is communicating (step S116). In the processing of step S116, the mobile object management server 100 may transmit information (for example, feature information) on the search target, information for notifying the user U that the camera 318 is to be activated, map information of a theme park, and the like in addition to the activation command.

Figure 12:
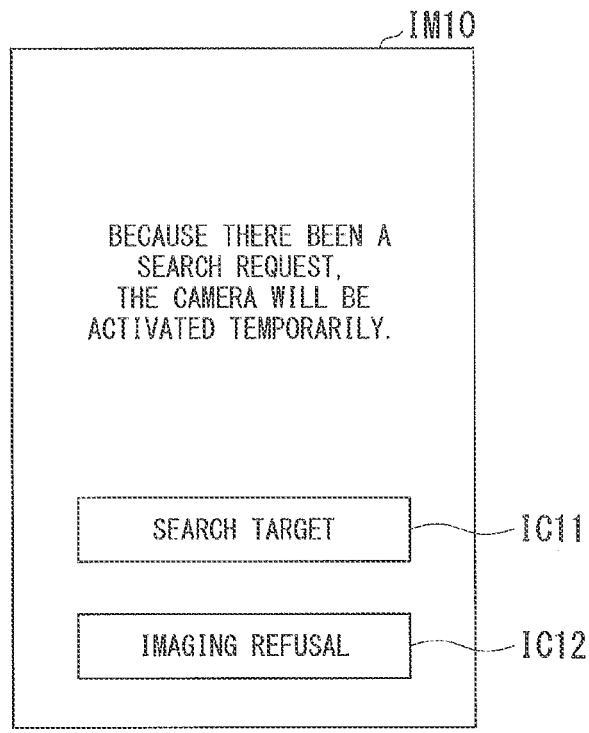
FIG. 12 is a diagram illustrating an example of an image that is displayed on a display of the terminal device.

The terminal device 200 receives the operation control information and the like transmitted from the mobile object management server 100, and transmits the received information to the boarding-type mobile object 300 in communication (step S118). When the terminal device 200 receives the operation control information for activating the camera 318, the terminal device 200 generates an image for notifying the user U that the camera 318 is to be activated, and notifies the user U of the generated image by causing the display to display the generated image (step S120). FIG. 12 is a diagram illustrating an example of an image IM10 that is displayed on the display of the terminal device 200. The image IM10 includes, for example, information indicating that the camera 318 is to be activated. In the example of FIG. 12, text information "Because there been a search request, the camera will be activated temporarily." is displayed in the image IM10. It is possible to inform the user U of a purpose or use of activating the camera 318 by displaying the image IM10 and notifying the user U, and to alleviate the discomfort of the user U because the imaging is not started without permission.

An icon IC11 for notifying the user U of the information on the search target may be displayed in the image IM10. When the icon IC11 is selected, information (for example, feature information or image information) on the search target transmitted from the mobile object management server 100 is displayed. This makes it possible not only to perform imaging, but also for the user U to visually search for the search target, and makes it possible to find the search target more efficiently. An icon IC12 for the user U to refuse the activation of the camera 318 may be displayed in the image IM10, instead of (or in addition to) the icon IC11. For example, when the user U really wants to refuse imaging at a current place or situation (for example, when the user U is in a bathroom or takes out his wallet for shopping), the user U selects the icon IC12 and refuses imaging. In this case, the terminal device 200 transmits information indicating stopping the activation of the camera 318 to the mobile object management server 100 and the boarding-type mobile object 300, and the activation (imaging) of the camera 318 is stopped. This makes it possible to stop the activation of the camera according to an intention of the user U. Hereinafter, a case in which the icon IC12 is not selected by the user U will be described.

Referring back to FIG. 10, the boarding-type mobile object 300 activates the camera on the basis of a camera activation command from the terminal device 200 (step S122), and starts imaging the surroundings of the boarding-type mobile object 300 (step S124). The imaging of the surroundings is executed even when the boarding-type mobile object 300 is moving or stopped. Next, the boarding-type mobile object 300 transmits the captured image (hereinafter referred to as a captured image) to the terminal device 200 (step S126). The terminal device 200 transmits the received captured image to the mobile object management server 100 together with information on a current place and time of the terminal device 200 (step S128).

The determiner 144 of the mobile object management server 100 performs image analysis of the received captured image to acquire feature information for each object included in the image, and determines whether or not the search target is included in the captured image on the basis of a degree of matching between the acquired feature information and the feature information that is a search target (step S130). For example, the determiner 144 determines that the search target is included in the captured image when the degree of matching of the feature information is equal to or greater than a threshold value, and determines that the search target is not included in the captured image when the degree of matching is smaller than the threshold value. In the following description, it is assumed that the determiner 144 determines that the search target is included in the captured image.

When a determination is made that the search target is included in the captured image, the mobile object management server 100 generates information for causing the search requester to perform final confirmation, and outputs the generated information to, for example, the terminal device of the search requester for notification to the search requester (step S132).

Figure 13:
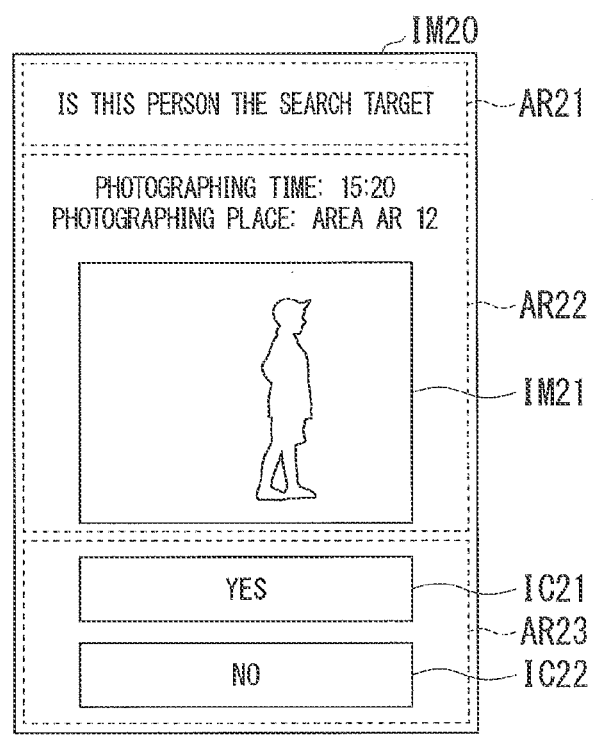
FIG. 13 is a diagram illustrating an example of an image for causing a search requester to finally confirm a search target.

FIG. 13 is a diagram illustrating an example of an image IM20 for causing the search requester to finally confirm the search target. The image IM20 includes, for example, a text information display area AR21, a captured image display area AR22, and a switch display area AR23. Information on inquiry information for the search target is displayed in the text information display area AR21. In the example of FIG. 13, text information "Is this person the search target?" is displayed in the text information display area AR21.

A captured image IM21 determined to include the search target and information on time and place at which the captured image has been captured are displayed in the captured image display area AR22. In the example of FIG. 13, 15:20 is displayed as a photographing time, and the area AR12 associated with the position information of the terminal device 200 is displayed as a photographing place. An icon IC21 indicating that the search target is included in the image IM21 and an icon IC22 indicating that the search target is not included in the image IM21, for example, are included in the switch display area AR23. When the icon IC21 is selected by the search requester, the mobile object management server 100 is notified of information indicating that the search target is included in the image IM21, and when the icon IC22 is selected, the mobile object management server 100 is notified of information indicating that the search target is not included in the image IM21. In a case in which the search target is not included in the image IM21, the same notification is made when it is determined in subsequent determination that the search target is newly included in the captured image. The above-described processing is repeatedly executed when the search target is included in the image IM21 or until a predetermined time elapses since a search request is received.

When the image IM21 includes a search target (when the icon IC21 is selected), the mobile object management server 100 generates operation control information including a stop command for stopping imaging of the camera 318 (step S134), and transmits the generated operation control information to the terminal device 200 that is in communication with the boarding-type mobile object 300 whose camera 318 is stopped (step S136). The terminal device 200 receives the operation control information and the like and transmits the information to the boarding-type mobile object 300 in communication (step S138). The terminal device 200 notifies the user U by displaying information indicating that the camera 318 stops on the display (step S140).

Figure 14:
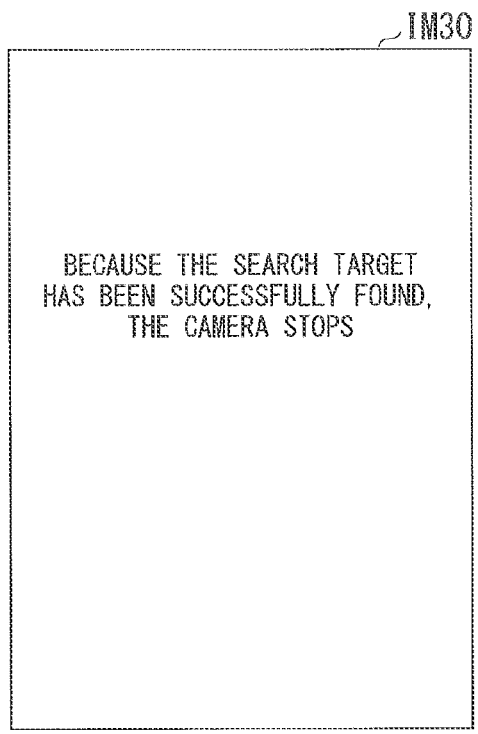
FIG. 14 is a diagram illustrating an example of an image for notifying that imaging of the camera is to be stopped.

FIG. 14 is a diagram illustrating an example of an image IM30 for notifying stopping imaging of the camera. In the example of FIG. 14, text information "Because the search target has been successfully found, the camera stops" is displayed in the image IM30. It is possible to give the user U a sense of relief due to finding of the search target by performing the notification using the image IM30, and also to suppress discomfort due to a camera operation because the imaging of the camera is stopped.

Referring back to FIG. 10, the boarding-type mobile object 300 receives the operation control information including the stop command and stops the imaging of the camera (step S142). This completes the processing of this sequence. The notification using steps S120, S132, and S140 described above may be performed by voice for part or all of information to be notified, instead of (or in addition to) images.

Through the above-described processing, when a search target is found, the search requester can directly find the search target by moving toward the shooting (imaging) location displayed in the image IM20.

When the search requester boards the boarding-type mobile object 300, the mobile object management server 100 may generate the operation control information for moving the boarding-type mobile object 300 boarded by the search requester to an area in which the search target has been found, and transmit the generated operation control information to the terminal device 200 of the search requester.

Figure 15:
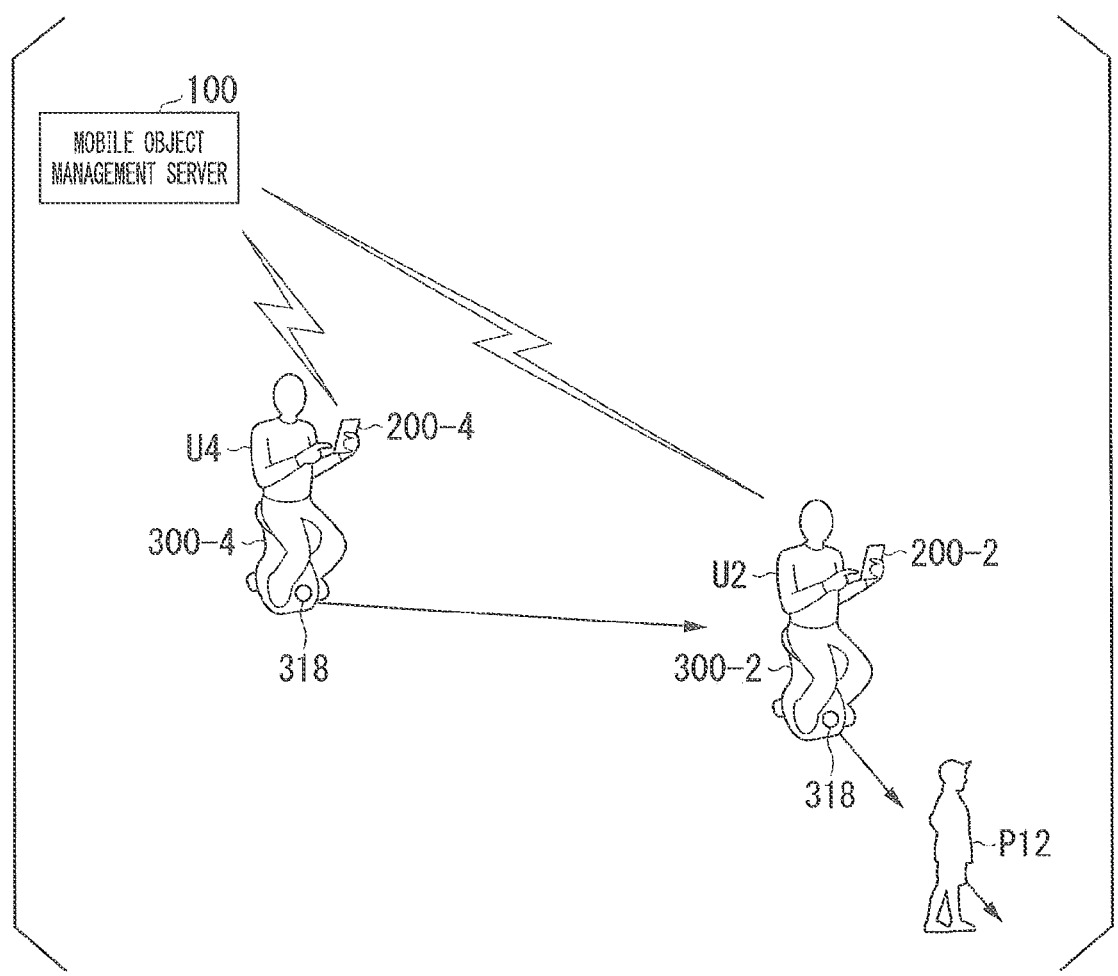
FIG. 15 is a diagram illustrating causing the search requester to move to a position of the search target.

FIG. 15 is a diagram illustrating moving the search requester to the position of the search target. In the example of FIG. 15, it is assumed that a user U4 is a search requester, boards a boarding-type mobile object 300-4, and owns a terminal device 200-4 that is communicating with the boarding-type mobile object 300-4. In such a scene, the mobile object management server 100 generates operation control information for moving the boarding-type mobile object 300-4 toward a position of the terminal device 200-2 owned by the user U2 who boards boarding-type mobile object 300-2 that has captured image IM21, and transmits the generated operation control information to boarding-type mobile object 300-4 via the terminal device 200-4. This makes it possible for the boarding-type mobile object 300-4 to move to the vicinity in which there is the search target (the person P12 in the example of FIG. 15).

The mobile object management server 100 or terminal device 200-4 may generate an image indicating moving the boarding-type mobile object 300-4 to the position of the search target when moving the boarding-type mobile object 300-4 to the vicinity in which there is the search target, and display the image on the display of the terminal device 200-4. The mobile object management server 100 or the terminal device 200-4 may generate an image in which a position at which the search target has been found has been plotted on the map information, or an image regarding a route from a current position of the boarding-type mobile object 300-4 to the position at which the search target has been found, and cause the image to be displayed on the display of the terminal device 200-4. This makes it possible for the search requester to more accurately acquire a distance to the search target, or the like.

When the search target (the person P12) moves as illustrated in FIG. 15, the mobile object management server 100 may generate an operation command to cause the boarding-type mobile object 300-2 that has captured image IM21 to track the search target and transmit the operation command to the boarding-type mobile object 300-2. This makes it possible for the boarding-type mobile object 300-4 to move to the vicinity of the search target without losing sight of the search target again. When the mobile object management server 100 causes a tracking movement to be executed, the mobile object management server 100 causes the light emitter 316 of the boarding-type mobile object 300-2 to emit light or causes a predetermined sound to be output from the speaker 317, thereby making it easier for the search requester to find. The mobile object management server 100 may display information indicating tracking the terminal device 200 on the display to notify the user U2. This makes it possible to alleviate the sense of incompatibility or discomfort of the user U2 due to the tracking movement of the boarding-type mobile object 300-2.

When position information of terminal devices 200-2 and 200-4 is within a predetermined distance, the mobile object management server 100 may determine that the user U4 has approached the search target, generate operation control information for ending the tracking operation of the boarding-type mobile object 300-2, and transmit the operation control information to boarding-type mobile object 300-2 via the terminal device 200-2.

Modification Example

Although in the above-described embodiment, the determiner 144 of the mobile object management server 100 has executed the processing of determining whether or not the search target is included in the image captured by the camera 318 of the boarding-type mobile object 300, the determiner 371 of the boarding-type mobile object 300 may instead execute the processing. In this case, the boarding-type mobile object 300 acquires the search information 186 from the mobile object management server 100 via the terminal device 200, for example, and the determiner 371 determines whether or not the search target is included in the captured image on the basis of the degree of matching between the feature information based on the result of analyzing the captured image and the feature information included in the search information 186.

In the embodiment, processing of determining whether or not the image captured by the camera 318 includes the search target may be executed by the application executer 250 (the mobile object management application 272) of the terminal device 200. In this case, the terminal device 200 acquires the search information 186 from the mobile object management server 100, acquires the captured image from the boarding-type mobile object 300, and determines whether or not the search target is included in the captured image on the basis of the degree of matching between the feature information based on the result of analyzing the captured image and the feature information included in the search information 186 using the application executer 250.

Although, in the embodiment, the mobile object management server 100 and the boarding-type mobile object 300 communicate via the terminal device 200, the mobile object management server 100 and the boarding-type mobile object 300 may communicate directly instead of this. In this case, the boarding-type mobile object 300 is provided with a position information acquirer that acquires position information or a communication function for communicating with the mobile object management server 100. In this case, it becomes possible to execute an operation regarding activation or stopping of the camera or an operation regarding movement of the boarding-type mobile object 300 that the user U does not board. For example, when the user U is not on board, the mobile object management server 100 can acquire the position information and the like from the boarding-type mobile object 300 to select whether or not the boarding-type mobile object 300 is a target whose camera is to be activated, generate operation control information for causing the selected boarding-type mobile object 300 to execute a predetermined operation, and transmit the generated operation control information to the boarding-type mobile object 300. This makes it possible to more efficiently search for a search target by using not only the boarding-type mobile object 300 that the user U boards, but also the boarding-type mobile object 300 that the user U does not board.

In the embodiment, the terminal device 200 is a terminal device owned by the user U, but the terminal device 200 may be lent together with the boarding-type mobile object 300 by the search system 1. In this case, the mobile object management server 100 associates the terminal device 200 with the boarding-type mobile object 300 in advance and manages the terminal device 200 and the boarding-type mobile object 300. In this case, the user information 182 may not include, for example, individual information (authentication information, address, name, age, and sex) of the user U. This makes it possible for even the user U (for example, a child or the elderly) who does not own the terminal device 200 to use the present service.

In the above-described embodiment, information on the activation or stopping of the camera 318 is output to the terminal device 200 for notification to the user U, but the notification may not be performed. This makes it possible to acquire the captured image without the user U being conscious of this.

According to the embodiment described above, a search system is the search system 1 including one or more boarding-type mobile objects 300 moving within the predetermined area and the mobile object management server 100 managing the boarding-type mobile objects 300, the search system 1 including the receiver 142 that receives registration of information on the search target, the imaging controller 150 that activates the imager (the camera 318) mounted on the one or more boarding-type mobile objects 300 when the registration of the information on the search target is received by the receiver 142, the acquirer 130 that acquires the image of the surroundings of the boarding-type mobile object captured by the imager, and the determiner 144 that determines whether the search target is included in the image acquired by the acquirer 130, thereby making it possible to search for the target object more efficiently while suppressing discomfort to the user.

According to the embodiment, because the camera of the boarding-type mobile object 300 within the area is temporarily activated only when it becomes necessary to perform search within the area, it is possible to collect a lot of data at the time of searching and effectively search for the search target object. According to the embodiment, because it is not necessary to install a new communication facility in an area such as a theme park in order for the mobile object management server 100 and the boarding-type mobile object 300 to perform communication and it is possible to perform the communication via the terminal device 200 owned by the user U, it is possible to suppress an equipment cost.

The embodiment described above can be expressed as follows.

A search device
includes a storage device that stores a program, and
a hardware processor, and
is configured to
receive registration of information on a search target,
activate an imager mounted on the one or more boarding-type mobile objects moving within a predetermined area when the registration of the information on the search target is received;
acquire an image of surroundings of the boarding-type mobile object captured by the imager; and
determine whether the search target is included in the acquired image, by the hardware processor executing the program stored in the storage device.

The modes for carrying out the present invention have been described above using the embodiments, but the present invention is not limited to such embodiments at all, and various modifications and replacements can be made without departing from the spirit of the present invention.

What is claimed is:

1. A search system including boarding-type mobile objects moving within a predetermined area and a mobile object management server managing the boarding-type mobile objects, the search system comprising:

a receiver configured to receive registration of information on a search target;
an imaging controller configured to, in response to receipt of the registration by the receiver, activate an imager mounted on a boarding-type mobile object, of the boarding-type mobile objects, existing within an area in which the search target is estimated to exist;
an acquirer configured to acquire an image of surroundings of the boarding-type mobile object captured by the imager; and
a determiner configured to determine whether the search target is included in the image acquired by the acquirer, wherein
in response to a determination that a predetermined time or more has passed since the search target was lost, the imaging controller activates the imager of all of the boarding-type mobile objects present within the predetermined area.

2. The search system according to claim 1, wherein the imaging controller notifies a user boarding the boarding-type mobile object with the imager mounted thereon of information indicating that the imager is to be activated or stopped, when the imaging controller activates or stops the imager.

3. The search system according to claim 1, wherein
the acquirer acquires a position of the boarding-type mobile object, and
in response to a determination by the determiner that the search target is included in the image, the imaging controller notifies a requester requesting search for the search target of information including a position of the search target and the image based on position information of the boarding-type mobile object acquired by the acquirer.

4. The search system according to claim 3, further comprising:
an operation controller configured to, in response to a determination that the requester has boarded the boarding-type mobile object, move the boarding-type mobile object to the position of the search target.

5. The search system according to claim 4, wherein the operation controller moves the boarding-type mobile object so that the boarding-type mobile object tracks the search target when the search target moves.

6. The search system according to claim 3, wherein the acquirer acquires position information of the terminal device owned by a user boarding the boarding-type mobile object, and uses the acquired position information as the position information of the boarding-type mobile object.

7. The search system according to claim 1, wherein the imaging controller stops imaging of the imager of the boarding-type mobile object in response to a determination by the determiner that the search target is included in the image acquired by the acquirer.

8. A search method comprising:
receiving registration of information on a search target by a computer of a mobile object management server managing boarding-type mobile objects moving within a predetermined area;
in response to the receiving, activating, by the computer, an imager mounted on a boarding-type mobile object, of the boarding-type mobile objects, existing within an area in which the search target is estimated to exist;
acquiring, by the computer, an image of surroundings of the boarding-type mobile object captured by the imager;
determining, by the computer, whether the search target is included in the image; and activating the imager of all of the boarding-type mobile objects present within the predetermined area in response to elapse of a predetermined time since the search target was lost.

9. A computer-readable non-temporary storage medium having a program stored thereon, the program causing a computer of a mobile object management server managing boarding-type mobile objects moving within a predetermined area to perform operations, the operations comprising:

receiving registration of information on a search target;

in response to the receiving, activating an imager mounted on a boarding-type mobile object, of the boarding-type mobile objects, existing within an area in which the search target is estimated to exist;

acquiring an image of surroundings of the boarding-type mobile object captured by the imager;

determining whether the search target is included in the image; and in response to an elapse of a predetermined time since the search target was lost, activating the imager of all of the boarding-type mobile objects present within the predetermined area.

* * * * *